Dec. 19, 1933.    G. A. CHUTTER    1,940,295
REGULATING SYSTEM
Filed May 25, 1929    2 Sheets-Sheet 1

Inventor:
George A. Chutter,
by Charles E. Mullan
His Attorney.

Patented Dec. 19, 1933

1,940,295

UNITED STATES PATENT OFFICE

1,940,295

REGULATING SYSTEM

George A. Chutter, Birmingham, Ala., assignor to General Electric Company, a corporation of New York Application May 25, 1929. Serial No. 366,055

9 Claims. (Cl. 172—246)

My invention relates to regulating systems, and particularly to a system for regulating the power factor of an alternating current circuit, and one object of my invention is to provide an improved arrangement for regulating the power factor of a circuit so as to maintain the power factor at a predetermined value.

In systems of alternating current distribution it is desirable to maintain the power factor of the distribution system at substantially unity in order to reduce the losses in the system to a minimum. In accordance with my invention, I accomplish this result by controlling by means of an improved power factor responsive device the amount of suitable reactive means which is connected to the circuit.

This application covers broadly certain subject matter which is disclosed and claimed in my earlier filed copending application Serial No. 269,778, filed April 13, 1928, which has matured into United States Letters Patent No. 1,752,887 which is assigned to the assignee of the present application.

My invention will be better understood from the following description, when taken in connection with the accompanying drawings and its scope will be pointed out in the appended claims.

Figure 1:
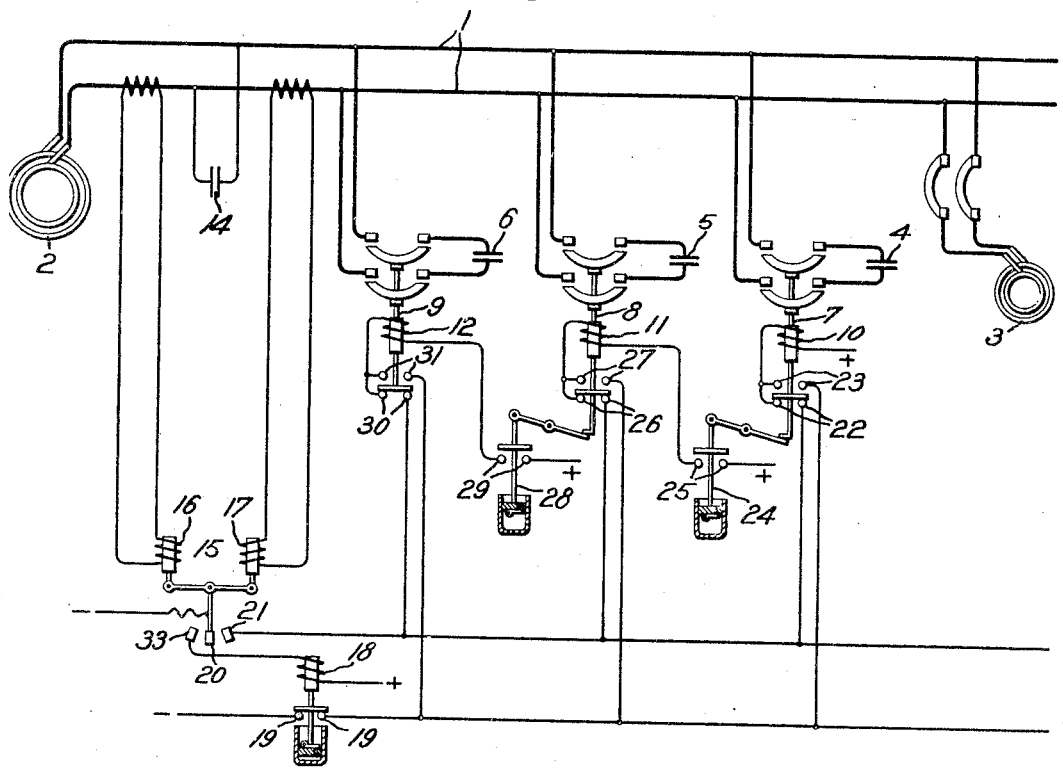
Figure 2:
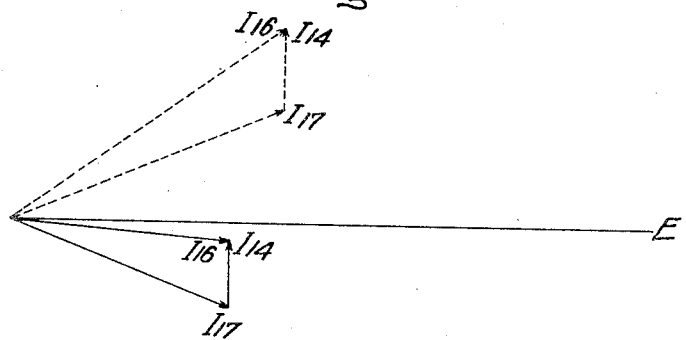
Figure 3:
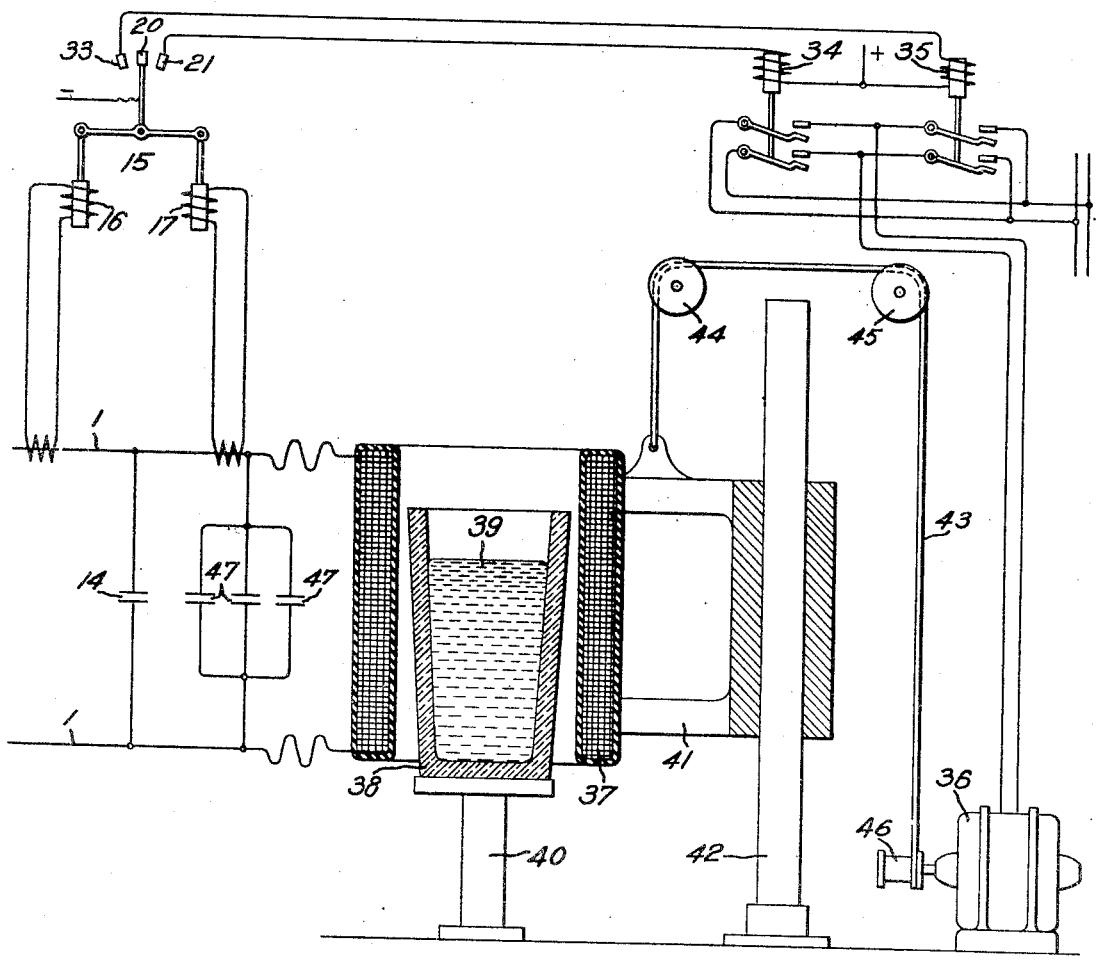

In the accompanying drawings, Fig. 1 is a diagrammatic showing of a power factor regulating system embodying my invention; Fig. 2 is a vector diagram illustrating the operation of my improved power factor responsive means; and Fig. 3 is a diagrammatic showing of another embodiment of my invention.

Referring to Fig. 1, 1 represents an alternating current circuit which is supplied with current from a suitable source 2, and which supplies current to a variable load 3. In the embodiment of my invention shown in Fig. 1 it is assumed that the load 3 is highly inductive so that if only the load 3 were connected to the circuit 1, the power factor thereof would be lagging.

In order that the power factor of the circuit 1 may be maintained at substantially unity or any other predetermined value above the power factor of the load 3, I provide a plurality of capacitors 4, 5 and 6 which are adapted to be connected across the circuit 1 by means of the circuit breakers 7, 8 and 9 respectively. These circuit breakers 7, 8 and 9 may be of any suitable type examples of which are well known in the art. As shown in Fig. 1 the circuit breakers 7, 8 and 9 are of the contactor type and are respectively provided with the operating coils 10, 11 and 12. While I have shown only three capacitors and their associated switching means, it is to be understood that any number of capacitors may be employed with my invention.

In order to control the operation of the circuit breakers 7, 8 and 9 so as to maintain the power factor of the circuit 1 at the desired value, I provide an improved power factor responsive device which is arranged to control the circuits of the operating coils 10, 11 and 12 so that the required number of capacitors are connected across the circuit 1 to maintain the desired power factor.

In the embodiment of my invention shown in Fig. 1 my improved power factor responsive means includes suitable reactive means such as capacitor 14 connected across the circuit 1 adjacent to the supply end thereof and a current differential relay 15 having two windings 16 and 17 which are connected in series relation with the circuit 1 on opposite sides of the capacitor 14 so that the current through the winding 16 is proportional to the total current supplied to the circuit 2 including the capacitor 14 and the current through the winding 17 is proportional to the current supplied to the circuit 2 excluding the capacitor 14. By properly designing the relay 15 the torques due to the currents in the windings 16 and 17 can be made equal for any given power factor of the circuit 1. The relay 15 is arranged so that when the power factor of the circuit 2 is below the desired value it effects the successive connection of the capacitors 4, 5 and 6 or as many as are necessary to restore the power factor to the desired value. When the power factor exceeds the desired value the relay 15 is arranged to effect the simultaneous disconnection of all of the capacitors except the capacitor 14 from the circuit 1. This result is obtained by having the relay 15 effect the energization of a control relay 18, the contacts 19 of which are in the energizing circuits of the operating coils of all of the circuit breakers 7, 8 and 9.

The operation of the arrangement shown in Fig. 1 will be better understood by reference to the vector diagram shown in Fig. 2. In this vector diagram the vectors $I_{17}$, $I_{14}$ and $I_{16}$ represent respectively the current in that portion of the circuit 2 in which the winding 17 is serially connected, the current through the capacitor 14 and the current in that portion of the circuit 2 in which the winding 16 is serially connected. The full line vectors $I_{17}$, $I_{14}$ and $I_{16}$ show the relative magnitudes of the currents when the current $I_{17}$ lags the impressed voltage E a predetermined amount and the dotted line vectors $I_{17}$, $I_{14}$ and $I_{16}$ show the relative magnitudes of the currents when the current $I_{17}$ leads the impressed voltage E a predetermined amount.

From the vector diagram it will be observed that when the current $I_{17}$ is lagging, it is greater than the current $I_{16}$ whereas when the current $I_{17}$ is leading, it is less than the current $I_{16}$. In accordance with my invention, I use this change in the relative values of the current $I_{16}$ and $I_{17}$, due to variations in the power factor of the load connected to the circuit 1, as a means of indicating the power factor of the load.

In the arrangement shown in Fig. 1, when the power factor of the load 3 exceeds a predetermined lagging value, the torque due to the current in the winding 17 exceeds the torque due to the current in the winding 16 so that the movable contact 20 of the relay 15 moves into engagement with the fixed contact 21 and thereby completes through auxiliary contacts 22 on the circuit breaker 7 an energizing circuit for the operating coil 10 of the circuit breaker 7. The closing of the circuit breaker 7 connects the capacitor 4 across the circuit 1. The circuit breaker 7 by opening its auxiliary contacts 22 during its closing operation interrupts the original energizing circuit for the operating winding 10. The circuit breaker 7, however, by closing its auxiliary contacts 23 completes through the contacts 19 of the relay 18 a holding circuit for the winding 10 which is independent of the contacts 20 and 21 of relay 15. The closing of the circuit breaker 7 also effects the operation of a suitable timing device 24 which is arranged to close the contacts 25 after the circuit breaker 7 has been closed a predetermined length of time.

If the connection of the capacitor 4 across the circuit 1 is not sufficient to restore the power factor of the circuit to the desired value, the contacts 20 and 21 of the relay 15 remain in engagement so that when the contacts 25 close after the closing of circuit breaker 7, an energizing circuit is complete for the operating coil 11 to effect the closing of the circuit breaker 8 and the connection of the capacitor 5 across the circuit 1. The energizing circuit of the winding 11 includes the contacts 20 and 21 of the relay 14, auxiliary contacts 26 on the circuit breaker 8 and contacts 25 of the timing means 24. The closing of the circuit breaker 8 effects the opening of the auxiliary contacts 26 and the closing of the auxiliary contacts 27 so that a holding circuit for the operating winding 11 is completed which is independent of the contacts 20 and 21 of the relay 15. The closing of the circuit breaker 8 also effects the operation of the timing means 28 which is arranged to close its contacts 29 after the circuit breaker 8 has been closed a predetermined length of time.

If the connection of the capacitor 5 does not restore the power factor of the circuit 1 to the desired value, the closing of the contacts 29 of the timing means 28 effects the completion of an energizing circuit for the operating winding 12 of the circuit breaker 9 to effect the closing of the circuit breaker 9 and the connection of the capacitor 6 across the circuit 1. The energizing circuit of the winding 12 includes the contacts 20 and 21 of the relay 15, the auxiliary contacts 30 on the circuit breaker 9 and the contacts 29 of the timing means 28. The closing of the circuit breaker 9 effects the opening of the auxiliary contacts 30 and the closing of the auxiliary contacts 31 so that a holding circuit for the operating winding 12 is completed to maintain the circuit breaker 9 closed independently of the contacts 20 and 21 of the relay 15.

From the above description it will be observed that the capacitors 4, 5 and 6 are arranged to be connected to the circuit 1 successively to restore the power factor of the circuit 1 to the desired value.

Whenever the power factor of the circuit 1 increases to such a value that the torque due to the current in the winding 16 exceeds the torque due to the current in the winding 17, the movable contact 20 of the relay 15 is moved into engagement with the stationary contact 33. The engagement of the contacts 20 and 33 completes an energizing circuit for the relay 18, which by opening its contacts 19 simultaneously interrupts the holding circuits of the operating windings of all of the closed circuit breakers. Therefore, all of the capacitors 4, 5 and 6 are disconnected from circuit 1. The capacitors 4, 5 and 6 are then successively connected to the circuit 1 in the manner above described to restore the power factor of the circuit 1 to the desired value.

In the modification of my invention shown in Fig. 3, I have disclosed an arrangement whereby the desired power factor of an electric circuit is obtained by varying the coupling between the primary inducing winding and the charge of an induction furnace instead of varying the number of capacitors connected across the circuit as shown in Fig. 1.

Referring to Fig. 3, the power factor responsive means 15, which is connected in the same manner as the power factor responsive means disclosed in Fig. 1, selectively controls the operation of two reversing switches 34 and 35 in the circuit of a reversible motor 36 which is arranged so that the operation thereof varies the coupling between a movable primary winding 37 and a stationary crucible 38 of an electric furnace. As shown, the crucible 38 which contains the metal 39 to be melted is a vertical elongated container which rests upon a heat and electrically non-conducting base 40. The primary winding 37 is shown as substantially surrounding the crucible 38 and is connected across the circuit 1, the power factor of which it is desired to maintain constant at a predetermined value. The winding 37 is supported by a frame 41 which is slidably mounted upon a fixed vertical post 42 and which is connected by means of a flexible rope or chain 43 passing over the pulleys 44 and 45 to a winding drum 46 which is driven by the reversible motor 36.

Suitable capacitors 47 may be connected in parallel with the winding 37 across the circuit 1 in order to improve the power factor.

The operation of the arrangement shown in Fig. 3 is as follows: When the power factor of the furnace circuit 1 exceeds a predetermined lagging value, the torque due to the current in the winding 17 of the power factor responsive means 15 exceeds the torque due to the current in the winding 16 so that the movable contact 20 of the relay 15 moves into engagement with the fixed contact 21. The closing of the contacts 20 and 21 completes an energizing circuit for the closing coil of the reversing switch 34 which, in turn, completes a circuit for the motor 36 so that the motor operates in a direction to lower the support 41 and the winding 37. This increase in the coupling between the winding 37 and the metal 39 in the furnace results in a decrease in the lagging power factor of the furnace. On the other hand, when the power factor of the furnace circuit 1 exceeds a predetermined leading value, the torque due to the current in the winding 16 exceeds the torque due to the current in the winding 17 so that the movable contact 20 of the relay 15 engages the stationary contact 33. The closing of the contacts 20 and 33 completes an energizing circuit for the closing coil of the reversing switch 35, which, in turn, completes an energizing circuit for the motor 36 so that the motor operates in a direction to raise the support 39 and the winding 37. The coupling between the winding 37 and the metal 39 is thereby decreased so that the current supplied to the furnace becomes more lagging.

If the power factor of the circuit 1 is such that there is no appreciable difference between the torques produced by the currents through the windings 16 and 17, the contact arm 20 remains midway between the contacts 21 and 33 so that the closing coils of both of the reversing switches 34 and 35 and the motor 36 are deenergized.

The arrangement disclosed in Fig. 3 is also disclosed in my earlier filed application Serial No. 269,778, filed April 13, 1928, and assigned to the assignee of the present application and the arrangement of controlling the coupling between the primary winding and the charge of an induction furnace in response to the power factor of a circuit is specifically claimed in said earlier filed application.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In combination, an electric circuit, reactive means connected across said circuit, and means responsive to the relative magnitudes of the currents in said circuit on opposite sides of said reactive means for controlling the power factor of said circuit.

2. In combination, an electric circuit, reactive means connected across said circuit, and a current differential relay having two cooperating windings respectively connected in series relation with said circuit on opposite sides of said reactive means for controlling the power factor of said circuit.

3. In combination, an electric circuit, a capacitor connected across said circuit, and means responsive to the relative magnitudes of the currents in said circuit on opposite sides of said capacitor for controlling the load connected to said circuit so as to maintain the power factor of said circuit at a predetermined value.

4. In combination, an electric circuit, a capacitor connected across said circuit, a current differential relay having two windings respectively energized in accordance with the currents in said circuit on opposite sides of said capacitor, and means controlled by said relay for varying the power factor of said circuit.

5. In combination with a load circuit, a capacitor connected across said circuit, current responsive devices connected in said circuit on opposite sides of said capacitor, and means responsive to variations in current strengths in said current responsive devices for maintaining the power factor of said circuit at substantially unity.

6. In a device for maintaining substantially unity power factor in a load circuit, a capacitor connected across said circuit, current responsive devices connected in said circuit on opposite sides of said capacitor, and means controlled by the difference in the currents in said current responsive devices for maintaining substantially unity power factor in said load circuit.

7. In combination, an electric circuit, a plurality of capacitors, one of which is connected across said circuit, means responsive to the relative currents in said circuit on opposite sides of said one of said capacitors, and means controlled by said relative current responsive means for effecting the successive connection of the other of said plurality of capacitors to said circuit.

8. In combination, an electric circuit, a plurality of capacitors, one of which is connected across said circuit, means responsive to the relative currents in said circuit on opposite sides of said one of said capacitors, and means controlled by said relative current responsive means for controlling the connection and disconnection of the other of said plurality of capacitors to and from said circuit.

9. In combination, an electric circuit, a plurality of capacitors, one of which is connected across said circuit, means responsive to the relative currents in said circuit on opposite sides of said one of said capacitors, and means controlled by said relative current responsive means for effecting the successive connection to said circuit of the other of said plurality of capacitors under predetermined electric conditions of said circuit and for effecting the simultaneous disconnection of all of said other of said plurality of capacitors from said circuit under predetermined electric conditions thereof.

GEORGE A. CHUTTER.